(12) United States Patent
Meyer et al.

(10) Patent No.: US 11,483,969 B2
(45) Date of Patent: Nov. 1, 2022

(54) VERTICAL SHAFT ELECTRIC POWERHEAD

(71) Applicant: Briggs & Stratton, LLC, Wauwatosa, WI (US)

(72) Inventors: Michael Meyer, Sussex, WI (US); Christy Matuszewski, Oak Creek, WI (US); Jim Nommensen, Oak Creek, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 586 days.

(21) Appl. No.: 16/492,371

(22) PCT Filed: Mar. 9, 2018

(86) PCT No.: PCT/US2018/021679
§ 371 (c)(1),
(2) Date: Sep. 9, 2019

(87) PCT Pub. No.: WO2018/165513
PCT Pub. Date: Sep. 13, 2018

(65) Prior Publication Data
US 2021/0127572 A1    May 6, 2021

Related U.S. Application Data

(60) Provisional application No. 62/469,470, filed on Mar. 9, 2017.

(51) Int. Cl.
*A01D 34/78* (2006.01)
*A01D 34/81* (2006.01)
*A01D 34/67* (2006.01)

(52) U.S. Cl.
CPC ............. *A01D 34/78* (2013.01); *A01D 34/81* (2013.01); *A01D 34/67* (2013.01)

(58) Field of Classification Search
CPC ......... A01D 34/78; A01D 34/81; A01D 34/67
See application file for complete search history.

(56) References Cited

U.S. PATENT DOCUMENTS

| 2,307,538 A | 1/1943 | Paulus |
| 5,268,607 A | 12/1993 | McManus |
| 5,787,693 A | 8/1998 | Dyke |

(Continued)

OTHER PUBLICATIONS

International Search Report and Written Opinion, PCT/US2018/021679, Briggs & Stratton Corporation (dated Jun. 11, 2018).

*Primary Examiner* — Abigail A Risic
(74) *Attorney, Agent, or Firm* — Foley & Lardner LLP

(57) ABSTRACT

An electric powerhead includes a housing including a mounting assembly, wherein the mounting assembly includes a mounting plate and a mounting insert. The mounting plate includes a shaft opening and a plurality of first openings arranged in a standard vertical shaft engine mounting pattern and the mounting insert includes a plurality of second openings aligned with the plurality of first openings. The electric powerhead further includes an electric motor positioned within the housing, wherein the electric motor includes an output shaft that extends through the shaft opening of the mounting assembly and wherein the output shaft is configured to rotate about an axis of rotation.

18 Claims, 20 Drawing Sheets

(56) References Cited

U.S. PATENT DOCUMENTS

| | | |
|---|---|---|
| 6,889,490 B2 | 5/2005 | Hornung |
| 2014/0095002 A1 | 4/2014 | Crecelius et al. |
| 2019/0341826 A1* | 11/2019 | Zeiler ...................... H02K 5/00 |
| 2020/0288634 A1* | 9/2020 | Hasegawa .............. A01D 34/81 |
| 2021/0017933 A1* | 1/2021 | Kobayashi .............. F02B 75/22 |
| 2021/0169001 A1* | 6/2021 | Xiao ...................... A01D 34/68 |
| 2021/0169007 A1* | 6/2021 | Xiao ...................... A01D 34/78 |

* cited by examiner

US 11,483,969 B2

VERTICAL SHAFT ELECTRIC POWERHEAD

CROSS-REFERENCE TO RELATED APPLICATIONS

This application is a National Stage Application of PCT/US2018/021679, filed Mar. 9, 2018, which claims the benefit of U.S. Provisional Application No. 62/469,470, filed Mar. 9, 2017, both of which are incorporated herein by reference in their entireties.

BACKGROUND

The present invention generally relates to prime movers for outdoor power equipment. More specifically, the present invention relates to an electric power head and energy storage device for driving and/or powering various components of a piece of outdoor power equipment.

SUMMARY

One embodiment of the invention relates to an electric powerhead including a housing with a mounting assembly and an electric motor positioned within the housing. The mounting assembly includes a plastic mounting plate comprising a shaft opening and multiple first openings arranged in a standard vertical shaft engine mounting pattern and a metallic mounting insert comprising multiple second openings aligned with the plurality of first openings. The electric motor includes an output shaft that extends through the shaft opening of the mounting assembly and wherein the output shaft is configured to rotate about an axis of rotation.

Another embodiment of the invention relates to outdoor power equipment including an electric powerhead including a housing with a mounting assembly, an electric motor positioned within the housing, and an electric switch box configured to provide transmission control to the outdoor power equipment. The mounting assembly includes a plastic mounting plate comprising a shaft opening and multiple first openings arranged in a standard vertical shaft engine mounting pattern and a metallic mounting insert comprising multiple second openings aligned with the plurality of first openings. The electric motor includes an output shaft that extends through the shaft opening of the mounting assembly and wherein the output shaft is configured to rotate about an axis of rotation.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
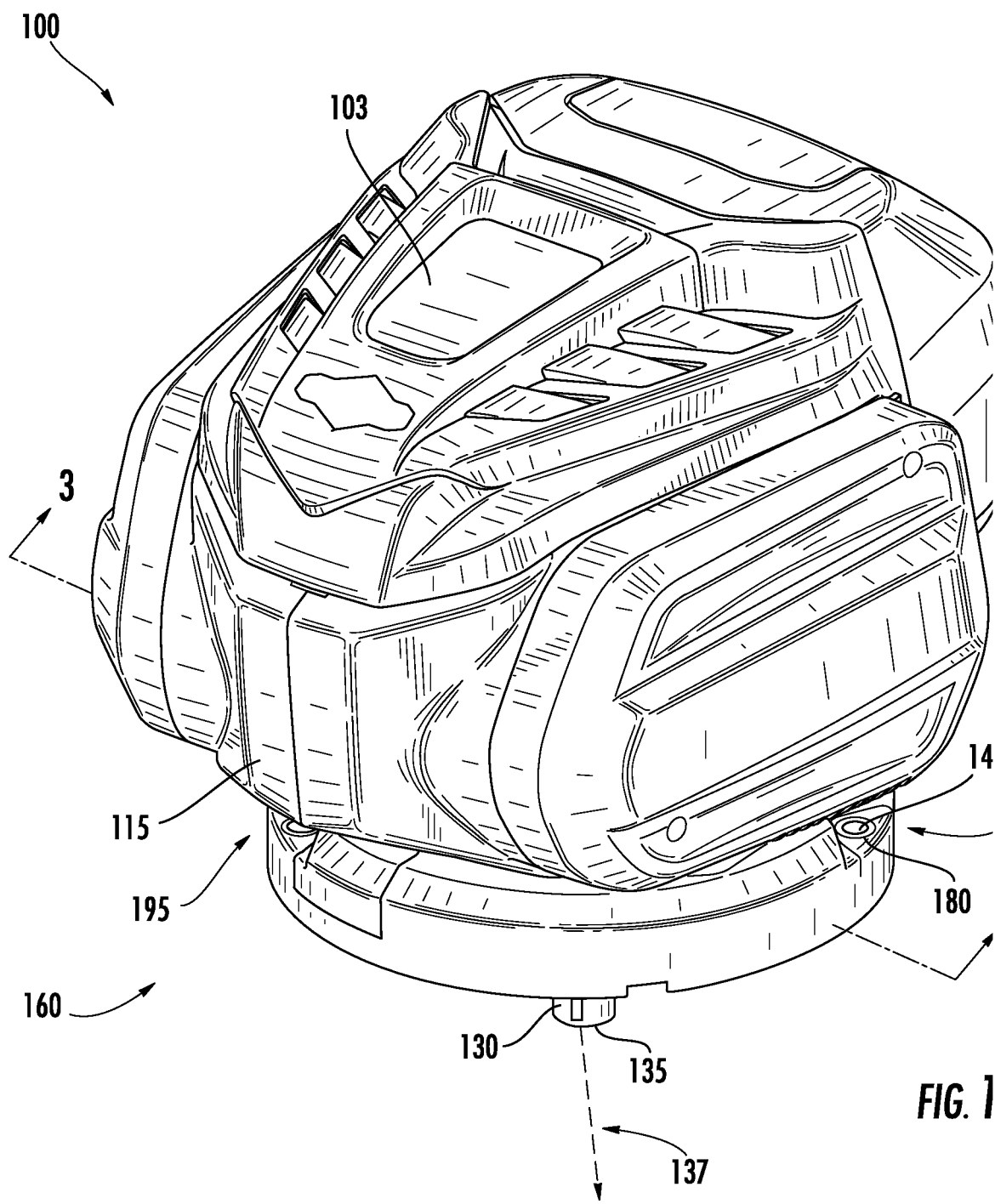
FIG. 1 is a top perspective view of an electric powerhead, according to an exemplary embodiment.
Figure 2:
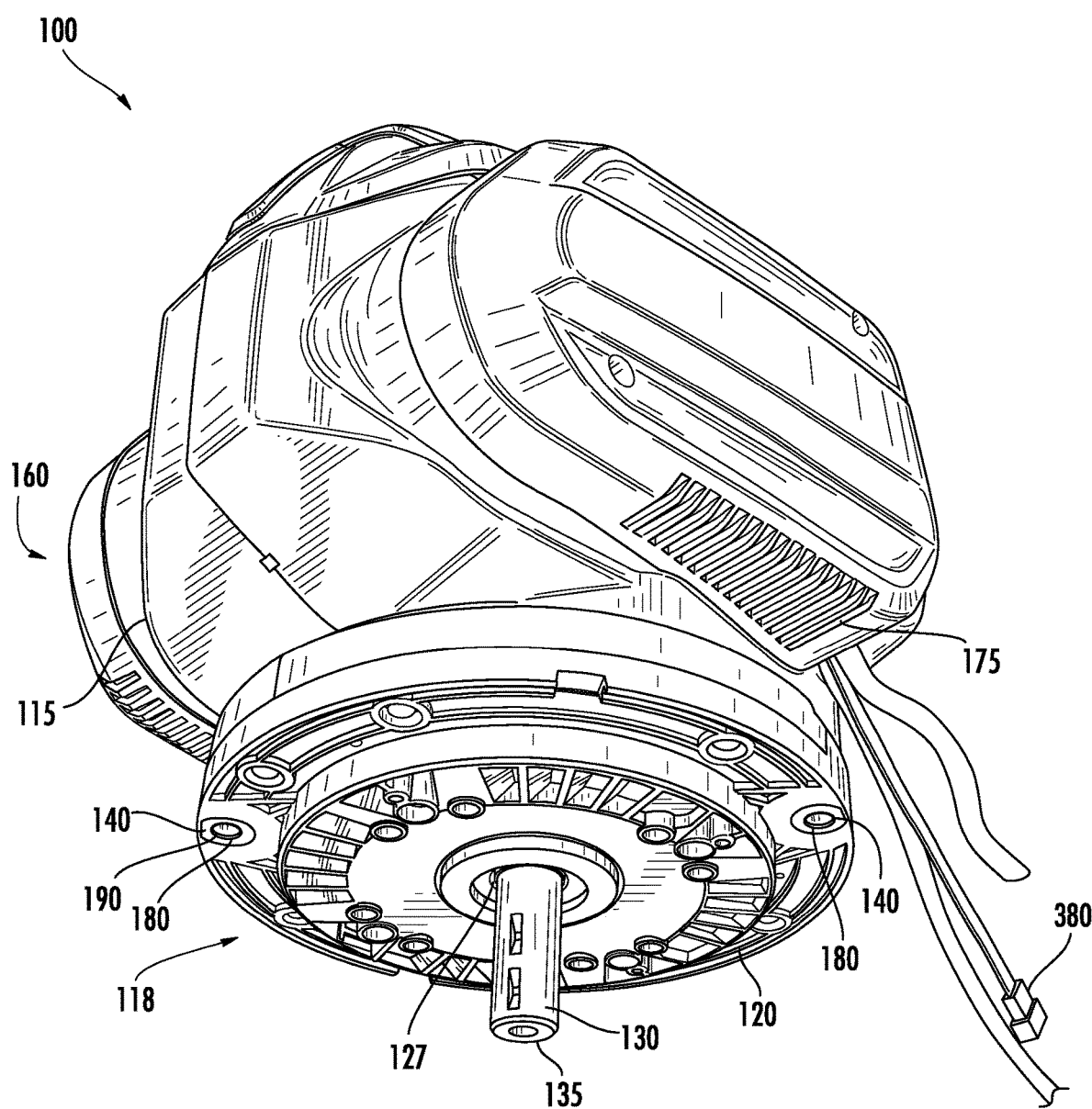
FIG. 2 is a bottom perspective view of the electric powerhead of FIG. 1, according to an exemplary embodiment.
Figure 3:
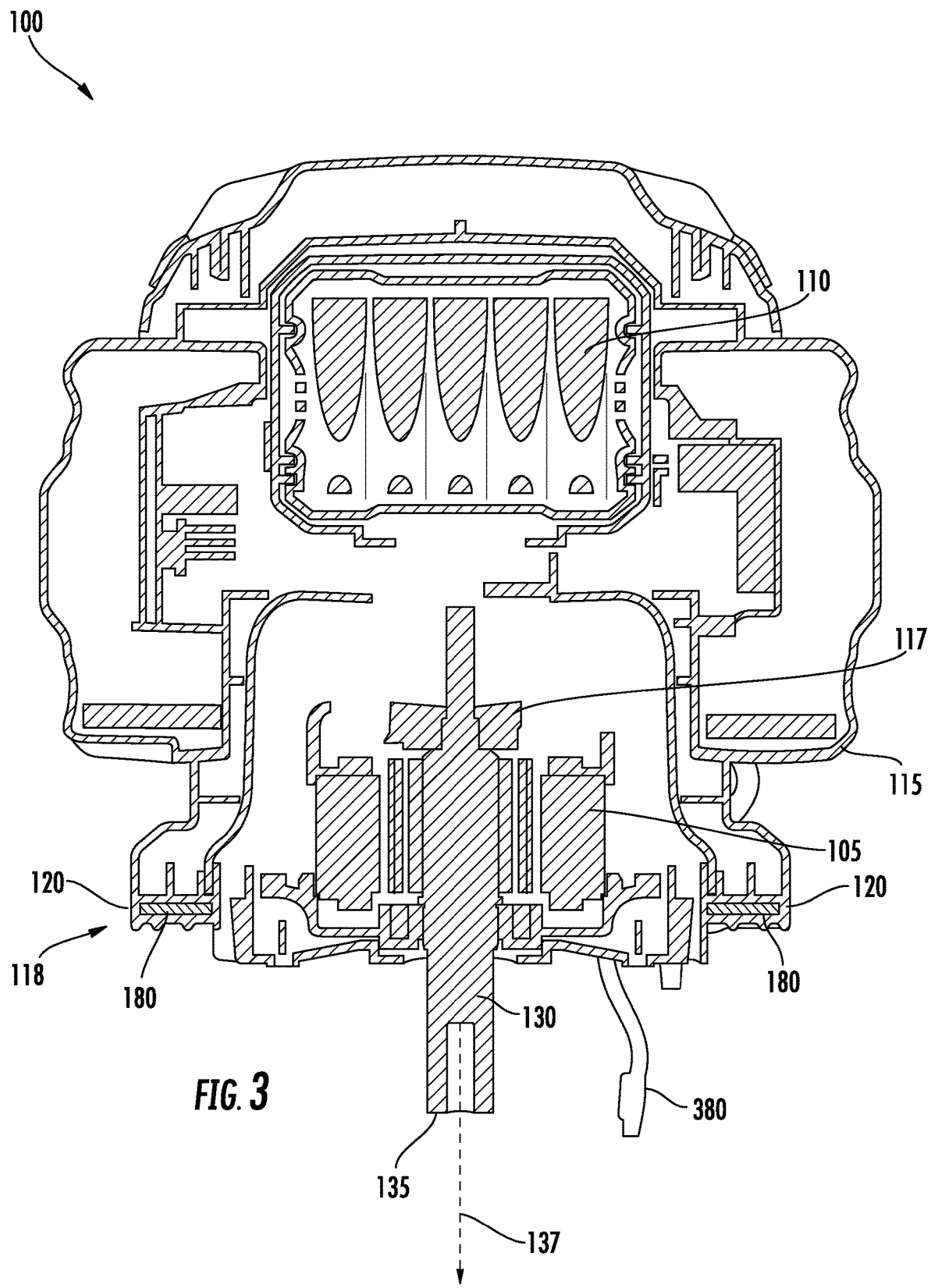
FIG. 3 is a section view of the electric powerhead of FIG. 1 along line 3-3, according to an exemplary embodiment.

FIGS. 1-3 illustrate an electric powerhead 100 according an exemplary embodiment. The electric powerhead 100 includes an electric motor 105 and an energy storage device or battery 110 that powers the electric motor 105 and other electrical components. The electric powerhead 100 serves as a replacement for a small internal combustion engine of the type frequently used on a variety of equipment, including outdoor power equipment and portable jobsite equipment. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, portable generators, etc. Outdoor power equipment may, for example, use the electric powerhead 100 to drive an implement, such as a rotary blade of a lawn mower, a pump of a pressure washer, an auger of a snow thrower, and/or a drivetrain of the outdoor power equipment. Portable jobsite equipment includes portable light towers, mobile industrial heaters, and portable light stands.

Figure 4:
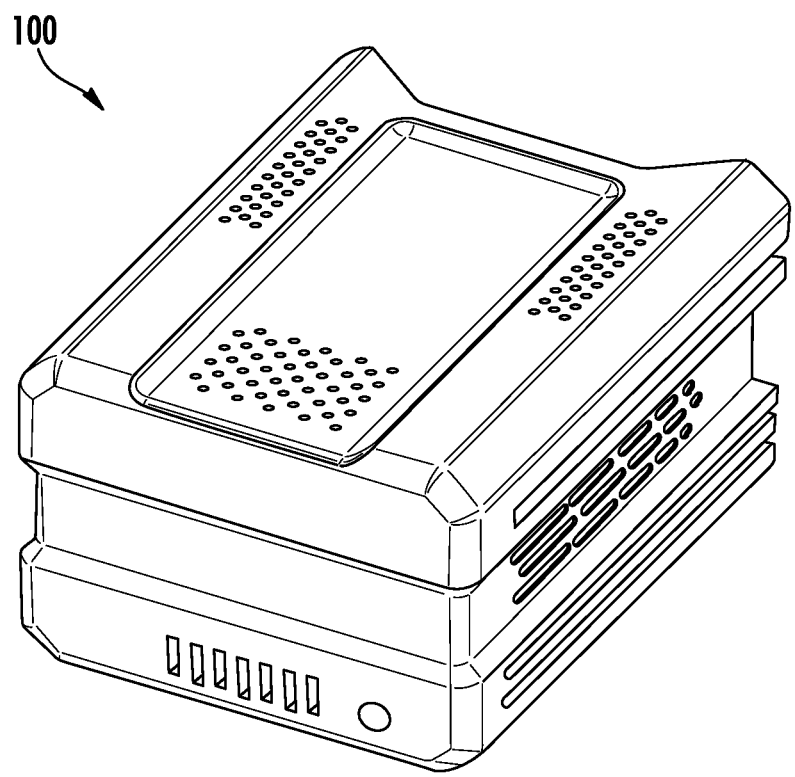
FIG. 4 is a perspective view of a battery of the electric powerhead of FIG. 1, according to an exemplary embodiment.

Referring to FIG. 4, the battery 110 is shown according to an exemplary embodiment. The battery 110 includes multiple electrochemical battery cells. According to an exemplary embodiment, each cell is a cylindrical lithium ion (Li-ion) cell that extends along a longitudinal cell axis. In other embodiments, the cells may be differently shaped (e.g., prismatic cells) or may have different battery chemistries (e.g., nickel-cadmium, lead-acid, nickel metal hydride, nickel-zinc, etc.). The battery 110 may be provided in different configurations providing different energy capacities and voltage ratings. For example, in some embodiments the battery 110 provides between 150 and 500 watt hours of energy at a voltage rating of 82 volts. In other embodiments, different energy capacities and voltage ratings are provided.

The electric powerhead 100 also includes a housing 115 with a mounting assembly 118 for securing the electric powerhead 100 to a mounting location on a piece of equipment (e.g., to secure the electric powerhead 100 to the deck of a lawn mower). The housing 115 is sized so that the electric powerhead 100 has substantially the same volume as a comparable small internal combustion engine that provides a similar mechanical output (e.g., power and torque) so that the electric powerhead 100 can be used as a direct replacement for comparable small internal combustion engines. The electric powerhead 100 provides a maximum output of approximately 5.5 horsepower (HP). Standard small internal combustion engines having a similar output have standard dimensions including a standard height, a standard width, a standard depth, and a standard cross-sectional area or footprint (width times depth). For example, for comparable standard small internal combustion engines, the standard depth is approximately 12 inches, the standard width is approximately 14.4 inches, the standard height is approximately 13.2 inches, with a cross-sectional area of approximately 172.8 inches squared and a volume of approximately 2280 cubic inches. A distance, area, or volume is "substantially the same" as one of the standard distances, areas, or volumes of a comparable standard small engine when such a distance, area, or volume allows another component having such a distance, area, or volume to be readily used in place of the standard small engine. In some embodiments of the present invention, plus or minus 15% of the distance, area, or volume is the outer limit for a distance, area, or volume to be considered "substantially the same" as one of the standard distances, areas, or volumes. In other embodiments, more or less maximum output is provided.

The electric motor 105 is positioned within the housing 115. The electric motor 105 may be directly supported by the housing 115 or supported by a cradle or other support structure located within the housing 115. In different embodiments, the electric motor 105 is provided with different power ratings (e.g. 1,500 watts, 2,500 watts, or 3,500 watts). In addition to the output shaft 130, the electric motor 105 includes a stator and a rotor. The rotor and the output shaft 130 rotate about the axis of rotation 137 when the electric motor 105 is activated. In some embodiments, a fan 117 is coupled to the rotor and rotates to cause cooling air to pass over the electric motor 105 when activated.

In some embodiments, an intake air filter is provided upstream of the motor intake air vent 175 to limit the intake of debris into the housing 115 with the intake of air through the vent 175. In some embodiments, the intake air filter includes a housing and a filter cartridge removably inserted into or attached to the housing. The filter cartridge includes filter media for filtering the air flow through the intake air filter. In some embodiments, the housing and/or the filter cartridge are arranged to provide cyclonic filters before filtering by the filter media by inducing a cyclonic airflow to remove debris from the airflow. In some embodiments, the electric motor 105 drives the fan used to draw air into a motor intake air vent 175 in an opposite direction to clear debris from the motor intake air vent 175 and/or the intake air filter.

Figure 14:
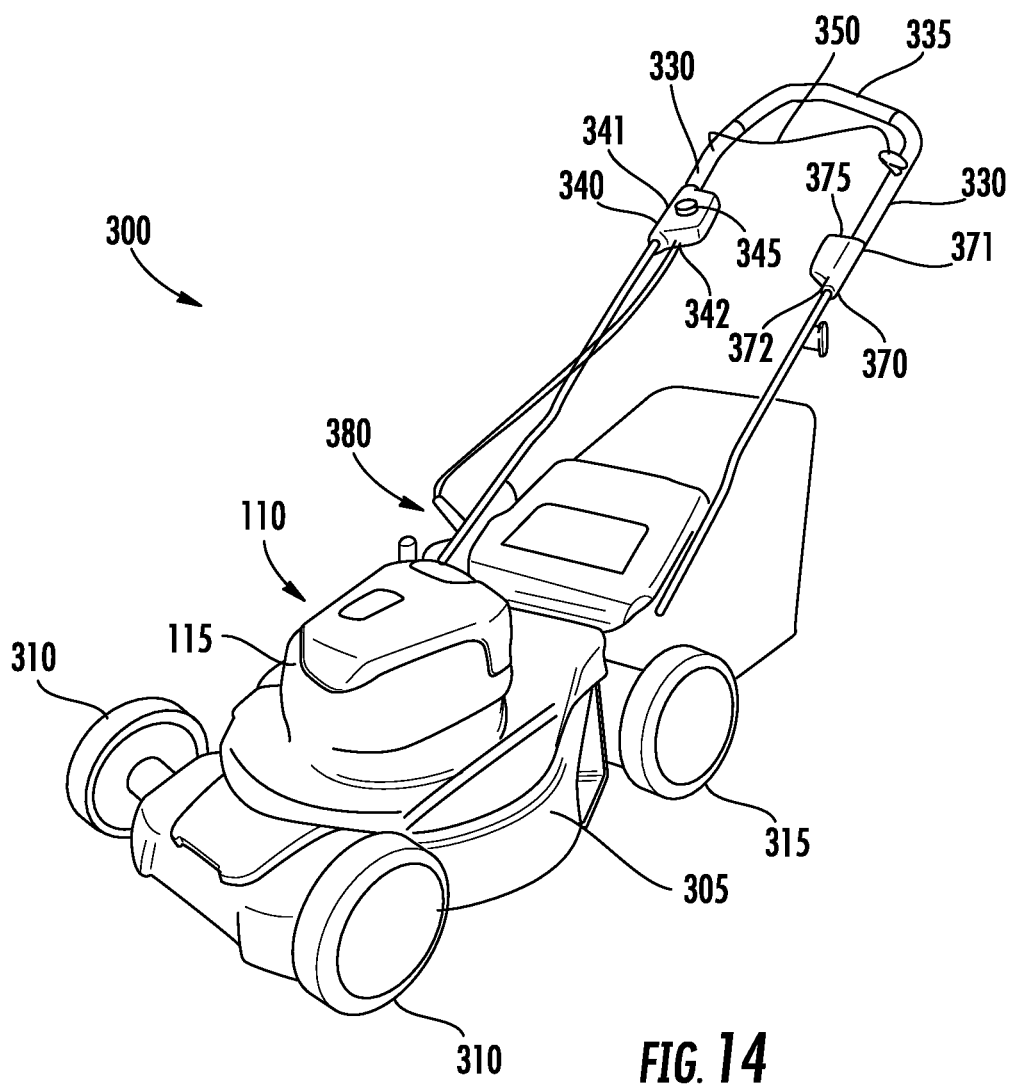
FIG. 14 is a perspective view of a lawn mower.

The mounting assembly 118 supports the electric powerhead 100 on the equipment the electric powerhead is used with (e.g., lawn mower 300 shown in FIG. 14). Bolts or other fasteners are inserted through the openings on the mounting assembly 118 to attach the electric powerhead 100 at a desired mounting location (e.g., lawn mower deck 305). The mounting assembly 118 includes a central opening or aperture 127 that allows the output shaft 130 of the electric motor 105 to extend through the mounting assembly 118. The end 135 of the output shaft 130 is located past the mounting assembly 118 outside of the housing 115.

Figure 5:
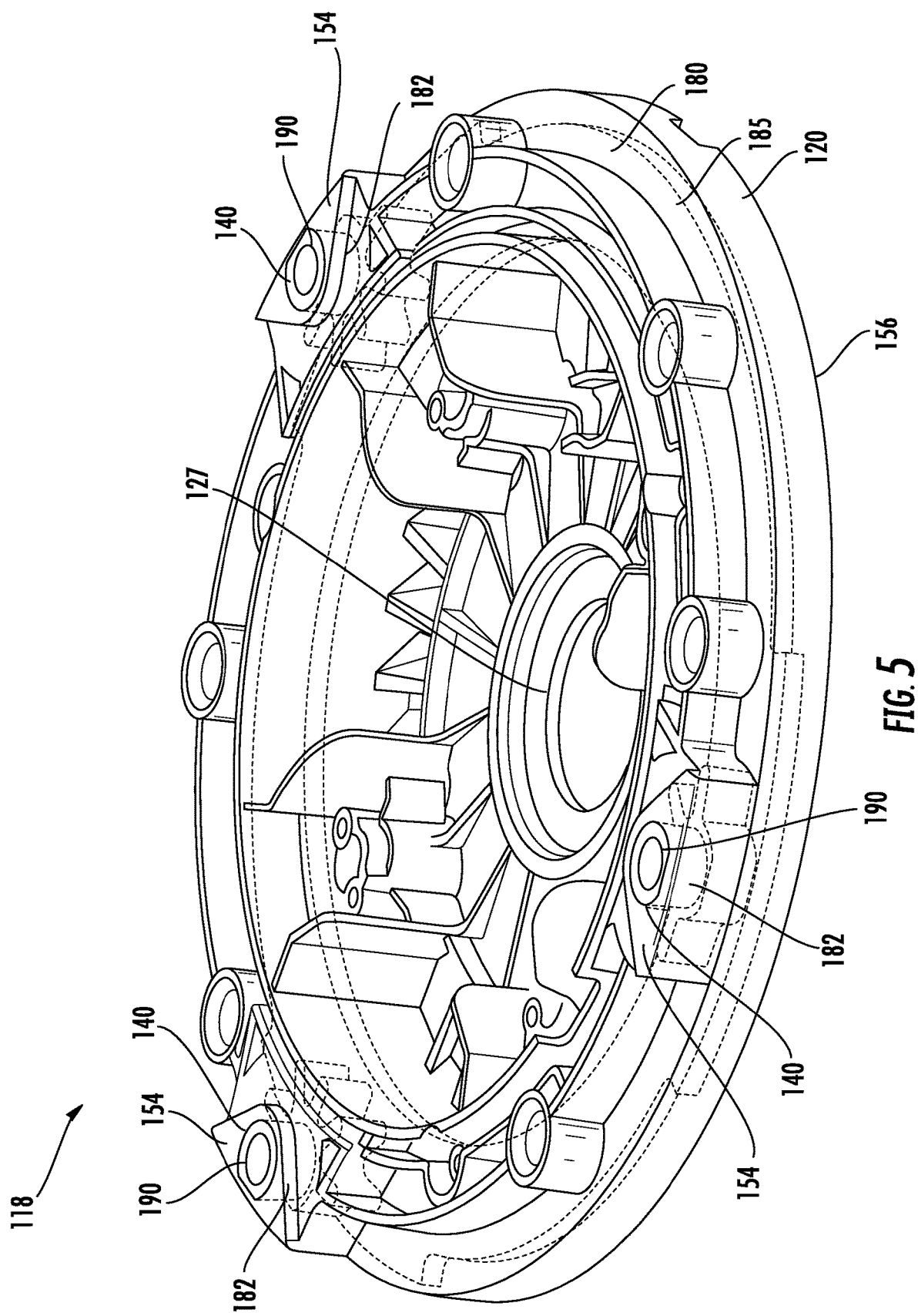
FIG. 5 is a perspective view of a mounting assembly of the electric powerhead of FIG. 1, according to an exemplary embodiment.
Figure 6:
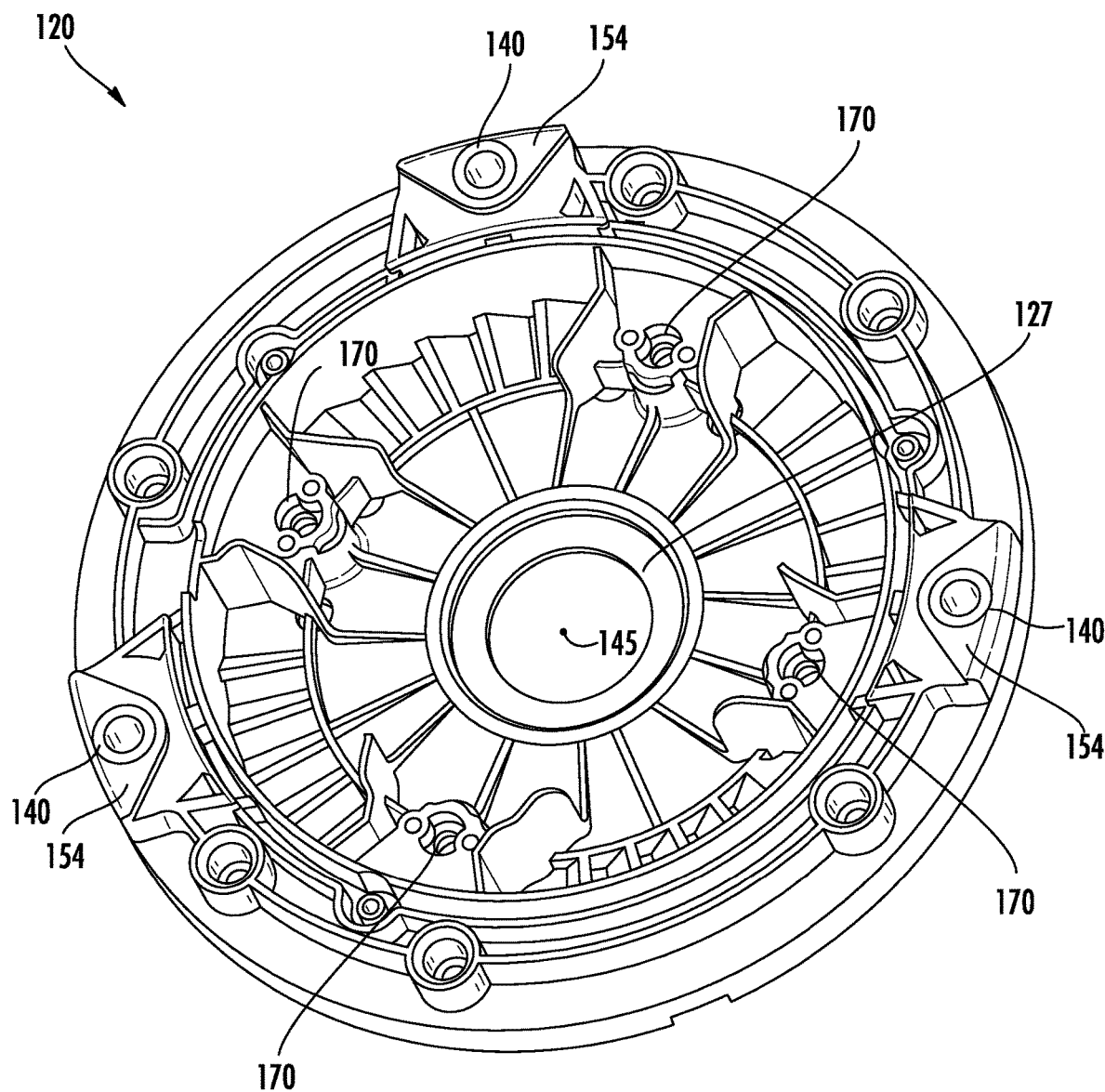
FIG. 6 is a perspective view of a mounting plate, according to an exemplary embodiment.
Figure 8:
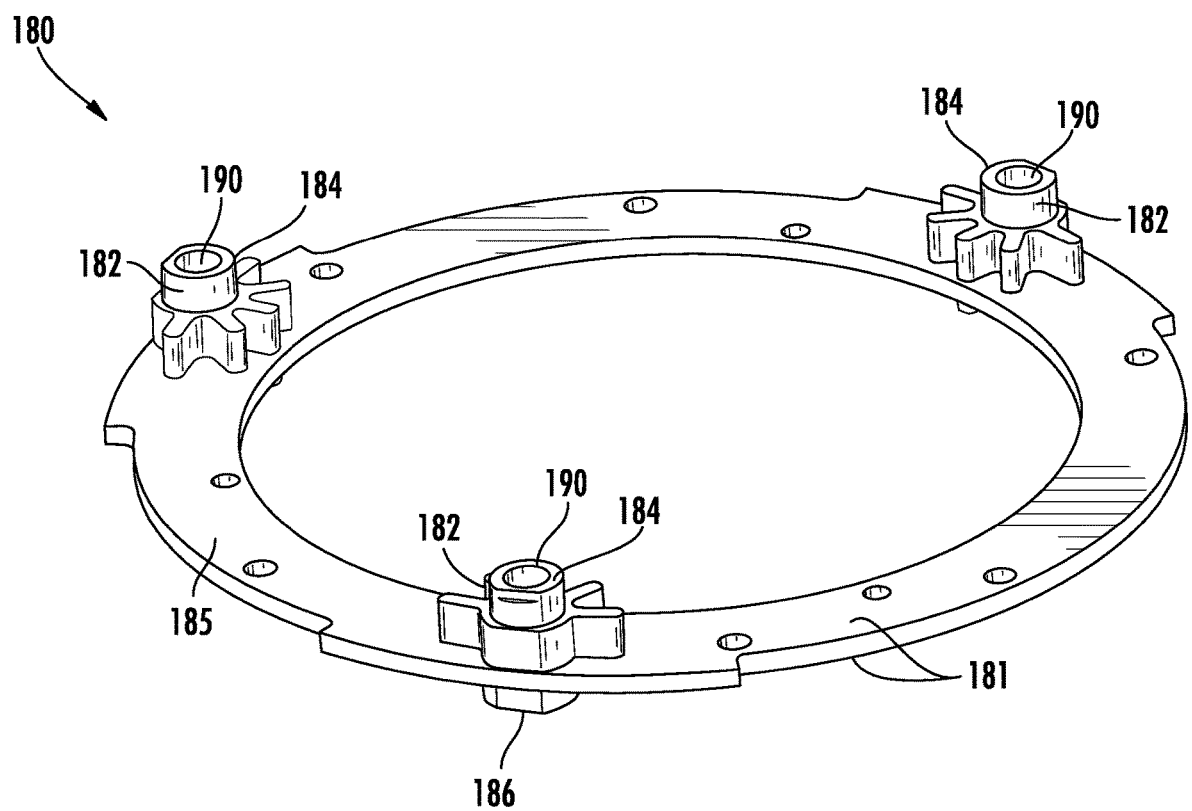
FIG. 8 is a perspective view of a mounting insert, according to an exemplary embodiment.

Referring to FIG. 5, the mounting assembly 118 includes a mounting plate 120 (FIG. 6) and an insert 180 (FIG. 8). The mounting plate 120 is molded over the insert 180 during a manufacturing process of the mounting assembly 118. The mounting plate 120 is made from a molded plastic. In other embodiments, the mounting plate 120 is made from another moldable material. The insert 180 is made from an aluminum material. In other embodiments, the insert 180 is made from another metallic material.

The mounting plate 120 includes a set of openings arranged in a standard vertical shaft engine mounting pattern (e.g., an SAE or other industry standard for mounting small internal combustion engines). Engine mounting patterns are standardized so that engines produced by different engine manufactures can be mounted to equipment produced by different original equipment manufacturers (OEMs) without having to customize the mounting arrangement between the engine and the equipment. This allows an OEM to offer the same equipment with different engines from different manufacturers to meet the OEM's engine needs or the customer's engine needs. Bolts or other fasteners are inserted through the openings to attach the mounting plate 120 at a desired mounting location. In other embodiments, the mounting plate 120 includes two or more sets of openings with each set arranged in a standard engine mounting pattern.

Figure 7:
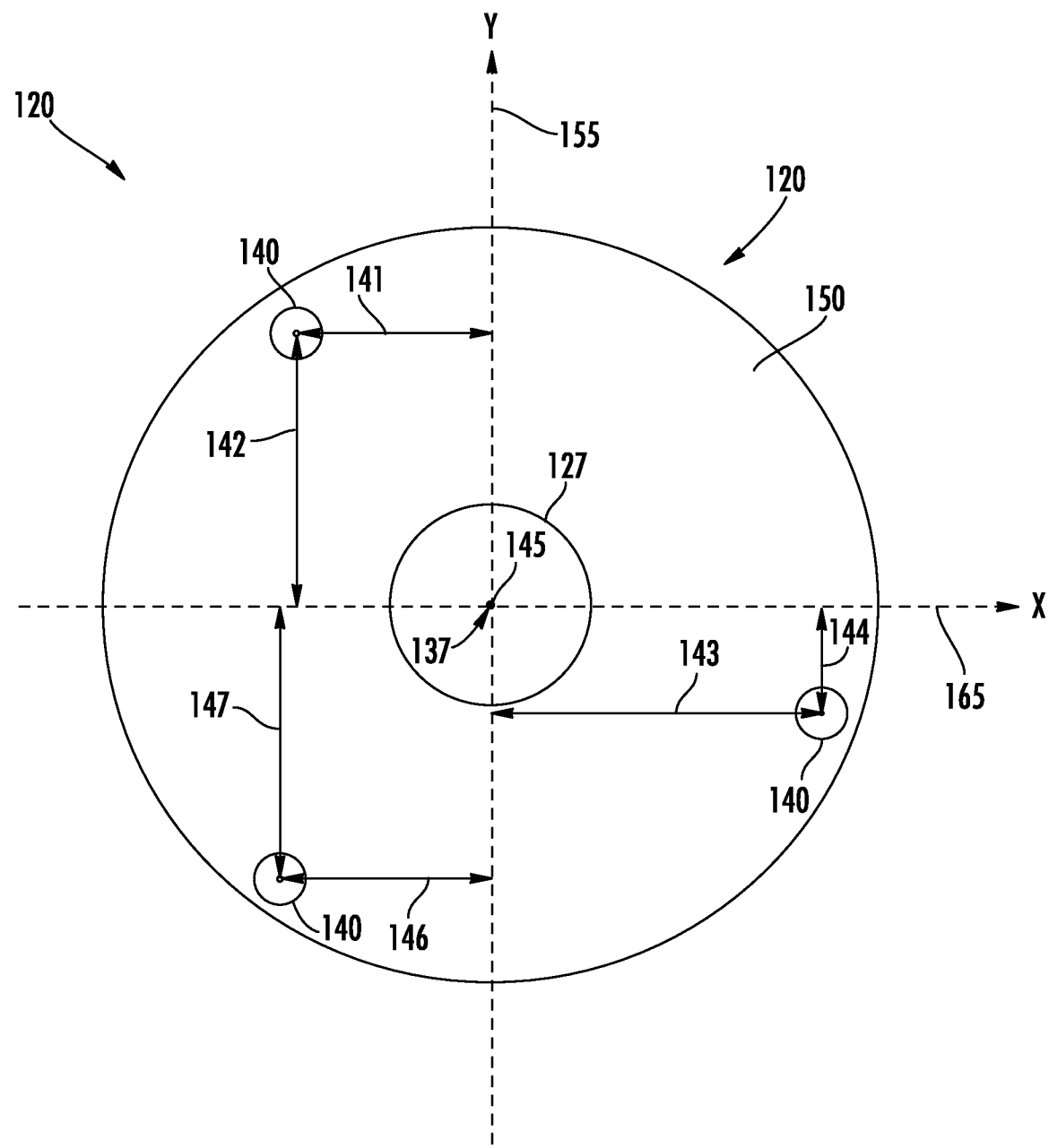
FIG. 7 is a top view of the mounting plate of FIG. 6, according to an exemplary embodiment.

In the illustrated embodiment shown in FIG. 7, the set of openings 140 has three openings 140. In a Cartesian coordinate system with the origin 145 located on the axis of rotation 137 at the outer surface 150 of the mounting plate 120 and a y-axis 155 pointing toward the front 160 (FIG. 1) of the electric powerhead 100 and an x-axis 165 perpendicular to the y-axis, the center point of the first opening 140 is positioned at a distance 141 from the origin 145 in the negative direction along the x-axis and at a distance 142 from the origin 145 in the positive direction along the y-axis, the center point of the second opening 140 is positioned at a distance 143 from the origin 145 in the positive direction along the x-axis and at a distance 144 from the origin 145 in the negative direction along the y-axis, and the third opening 140 is positioned at a distance 146 from the origin 145 in the negative direction along the x-axis and a distance 147 from the origin 145 in the negative direction along the y-axis. In some embodiments using one standard vertical shaft engine mounting pattern, the openings 140 have a diameter of 0.350 inch, the distance 141 is 2.408 inches, the distance 142 is 3.195 inches, the distance 143 is 3.683 inches, the distance 144 is 1.563 inches, the distance 146 is 2.625 inches, and the distance 147 is 3.019 inches. In other embodiments using other vertical shaft mounting patterns, these measurements are different.

Referring to FIG. 8, the insert 180 includes a ring-shaped portion 185 and a set of bosses or protrusions 182 extending outward from the outer surface 181 of the ring-shaped portion 185. The insert 180 includes a set of openings 190 including three openings 190 that align concentrically with the set of openings 140 on the mounting plate 120. Each opening 190 extends through the center of a protrusion 182. The openings 190 of the insert 180 are smaller in diameter (e.g., less than 0.350 inches) than the openings 140 of the mounting plate 120.

Figure 9:
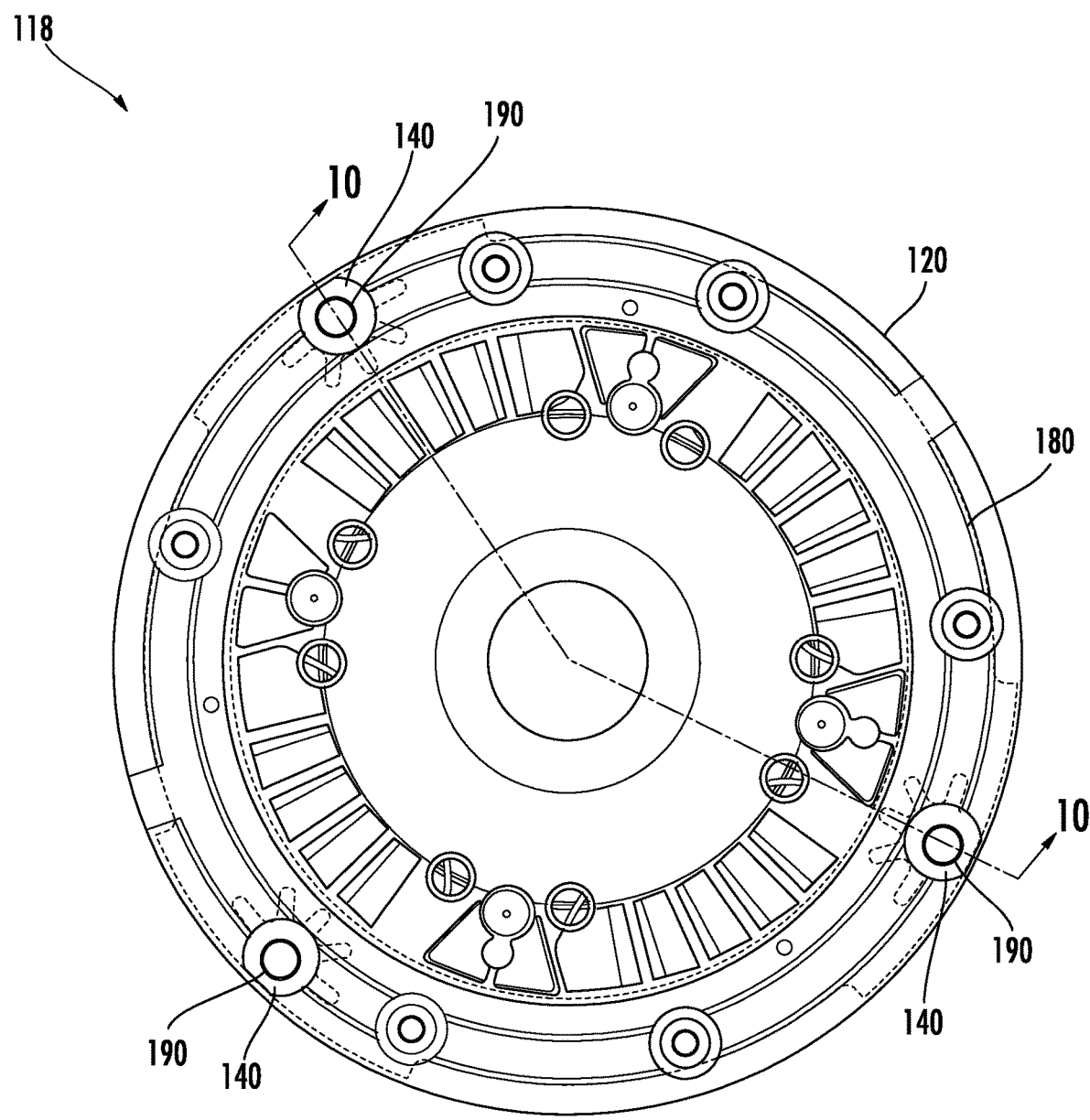
FIG. 9 is a perspective view of the mounting assembly of FIG. 5, according to an exemplary embodiment.
Figure 10:
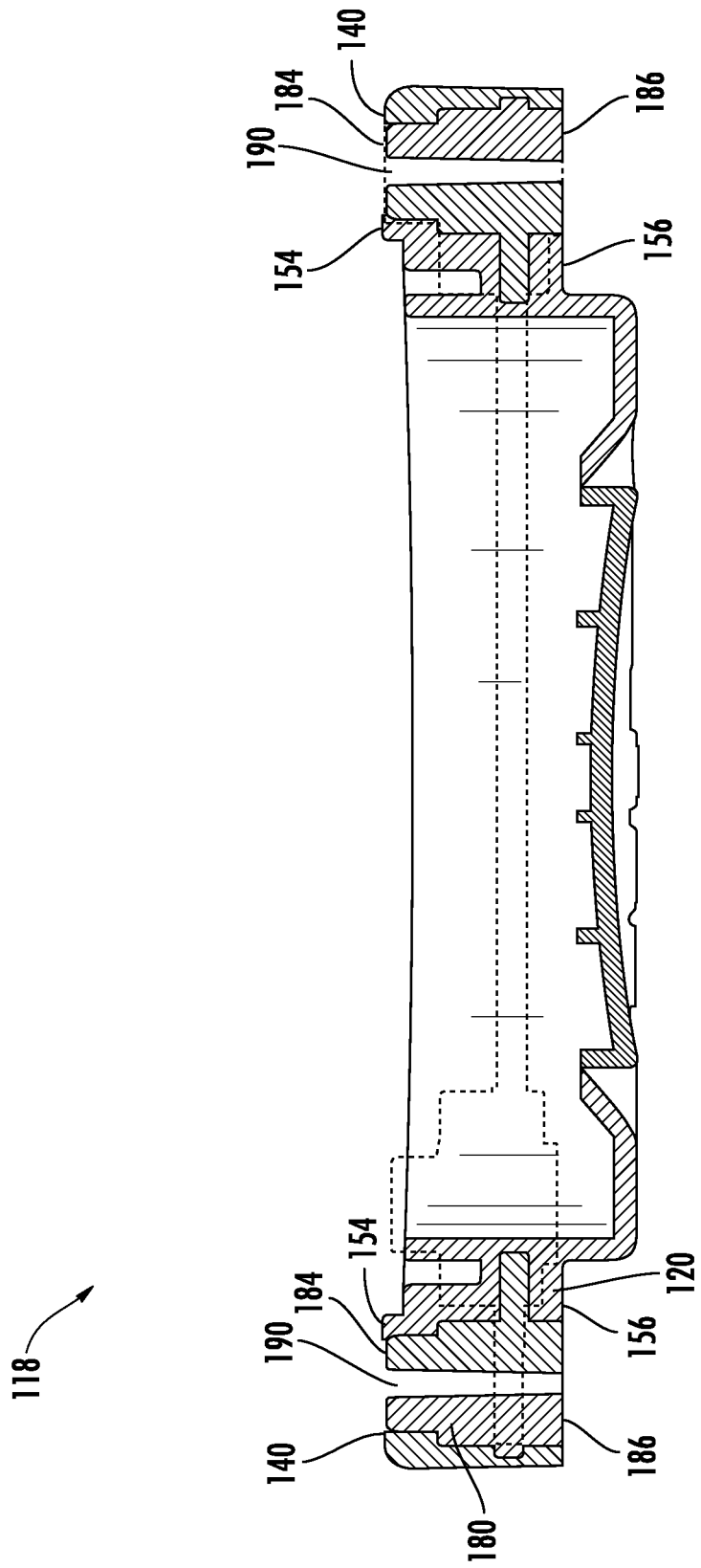
FIG. 10 is a section view of the mounting assembly of FIG. 9 along line 10-10, according to an exemplary embodiment.

As shown in FIGS. 9-10, when assembled with the mounting plate 120, the protrusions 182 extend through the mounting plate 120 such that the top surfaces 184 of the protrusions 182 are approximately flush with the top surface 154 of the mounting plate 120, the bottom surfaces 186 are approximately flush with the bottom surface 156 of the mounting plate 120, and the ring-shaped portion 185 is enveloped within the mounting plate 120. Accordingly, bolts or other fasteners that are used to mount the engine powerhead 100 to a piece of outdoor power equipment extend through the openings 190 and engage with (e.g., clamp against) the top surfaces 184 of the insert protrusions 182 instead of engaging with the mounting plate 120. As such, when mounting the engine powerhead 100 to a piece of equipment, fasteners are engaged with the metallic material of the insert 180 and not against the plastic material of the mounting plate 120. By fastening a metallic fastener against the metallic material of the insert 180, loosening of fasteners over time due to thermal changes and deformation of the plastic material is avoided.

Figure 11:
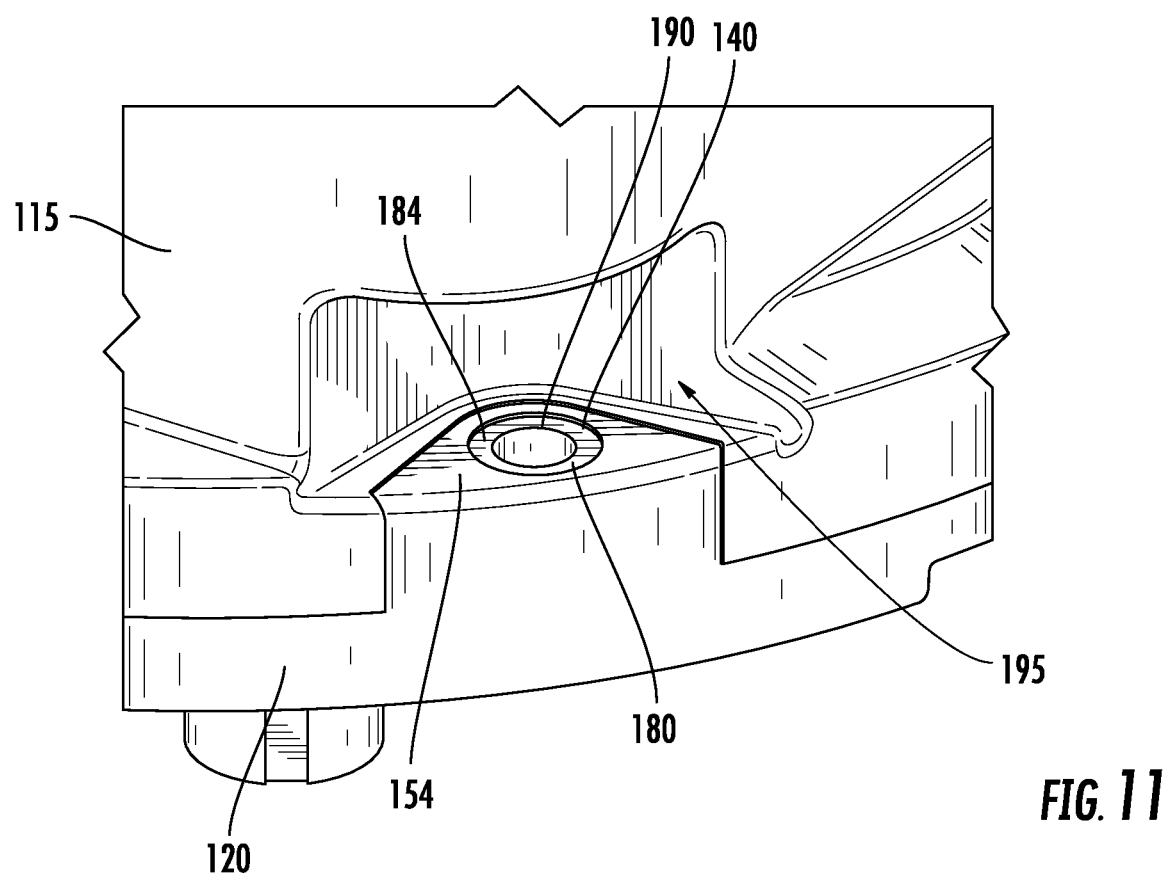
FIG. 11 is a detailed view of a clearance inset on the electric powerhead of FIG. 1, according to an exemplary embodiment.

As shown in FIG. 11, a clearance 195 formed in the housing 115 on the electric powerhead 100 allows various types of bolts or other fasteners to clamp onto the top surface 184 of the insert protrusions 182. The clearance 195 also allows for easier access of tools to tighten the fasteners during manufacture. The mounting assembly 118 allows an OEM to mount the engine powerhead 100 onto equipment (e.g., lawn mower 300) in a similar manner as mounting an existing engine. The orientation of the bolts or fasteners on the engine powerhead 100 allows for the same upside-down configuration already used in the manufacture of outdoor power equipment. Accordingly, the OEM does not need to change assembly methods or change tooling to mount the electric powerhead 100 to a piece of equipment.

Figure 12:
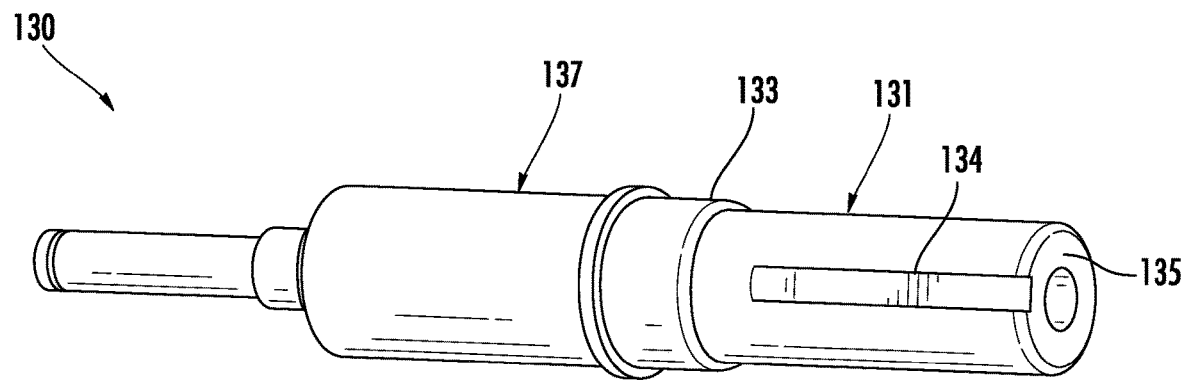
FIG. 12 is a perspective view of an output shaft of the electric powerhead of FIG. 1, according to an exemplary embodiment.
Figure 13:
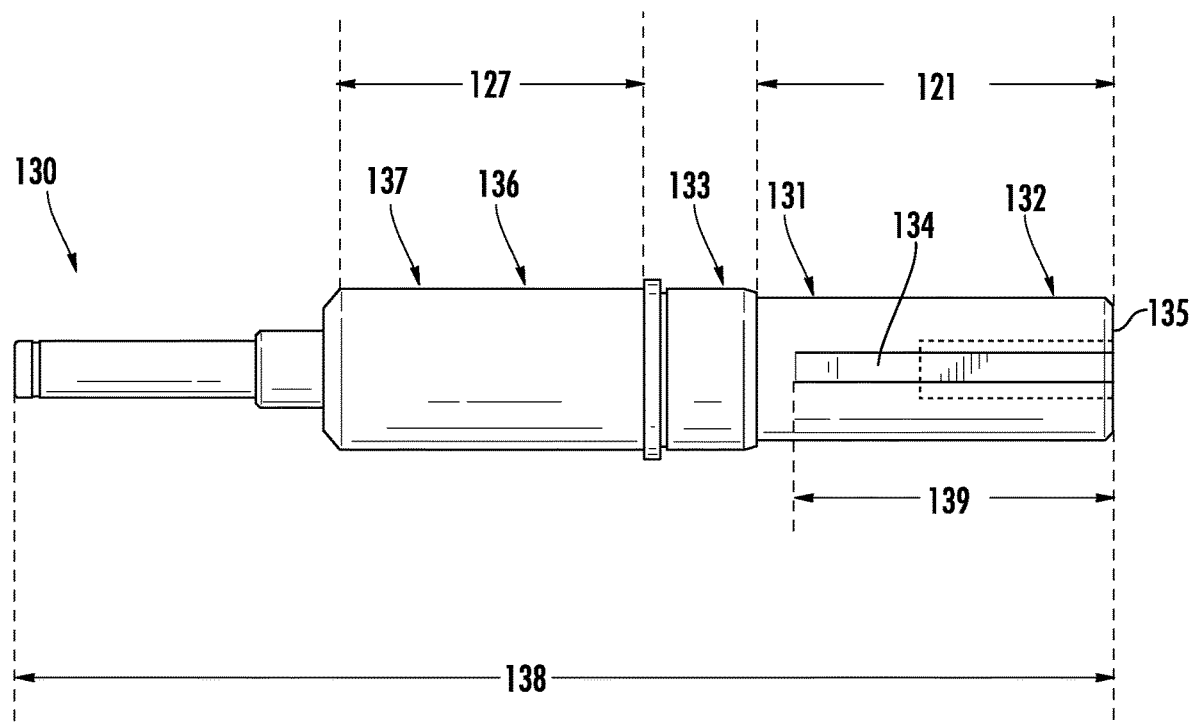
FIG. 13 is a side view of the output shaft of FIG. 12, according to an exemplary embodiment.

As shown in FIGS. 12-13, the output shaft 130 includes a first diameter 132 extending along a first portion 131 for a first length 121, a second diameter 136 extending along a second portion 137 for a second length 127, and an overall length 138. The first diameter 132 is smaller than the second diameter 136, with a step 133 positioned between the first and second diameters 132, 136. In other embodiments, the first diameter 132 is larger than the second diameter 136. In other embodiments, the first diameter 132 and second diameter 136 are the same. A keyway 134 extends from the end 135 along the first portion 131 for a length 139. The output shaft 130 is dimensionally similar to existing engine output shafts such that the output shaft 130 can be used across a wide variety of applications already using the existing engines. For example, in one embodiment, the output shaft 130 has a first diameter 132 of approximately 0.875 inches. In another embodiment, the first diameter 132 is approximately 0.984 inches (or 25 millimeters). In one embodiment, the first length 121 is approximately 2.438 inches. In another embodiment, the first length 121 is approximately 3.156 inches. In further embodiments, the first length 121 is approximately 1.812 inches. In other embodiments, the first length 121 can be shorter or longer in length and the first diameter 132 can be larger or smaller. With such dimensions, OEMs can use the output shaft 130 of the electric powerhead 100 without need for custom fitting or accessories to couple the output shaft 130 to existing equipment.

FIG. 14 illustrates a walk behind lawn mower 300 according to an exemplary embodiment. The lawn mower 300 includes an electric powerhead 100 attached to a mower deck 305 in a vertical shaft orientation. When the electric motor 105 is activated, the output shaft 130 drives a blade positioned underneath the mower deck 305 to cut grass. The lawn mower 300 also includes a pair of free-wheeling front wheels 310 and a pair of drive wheels 315. A handle 330 extends from the rear of the mower deck 305 and includes a bar 335 for the user to grasp to direct the travel of the lawn mower 300. User hand controls including a start button 345 positioned on a starter switch box 340 and a rotatable bail 350 are provided near the bar 335 to allow the user to provide operating commands (e.g., to activate or stop rotation of the blade, to activate or stop operation of the drive wheels 315, to control operation of other components of the lawn mower, including lighting units). Other types of user hand controls may be provided in other embodiments, including one or more switches, buttons, sliders, touch screens, or other user input devices.

Figure 15A:
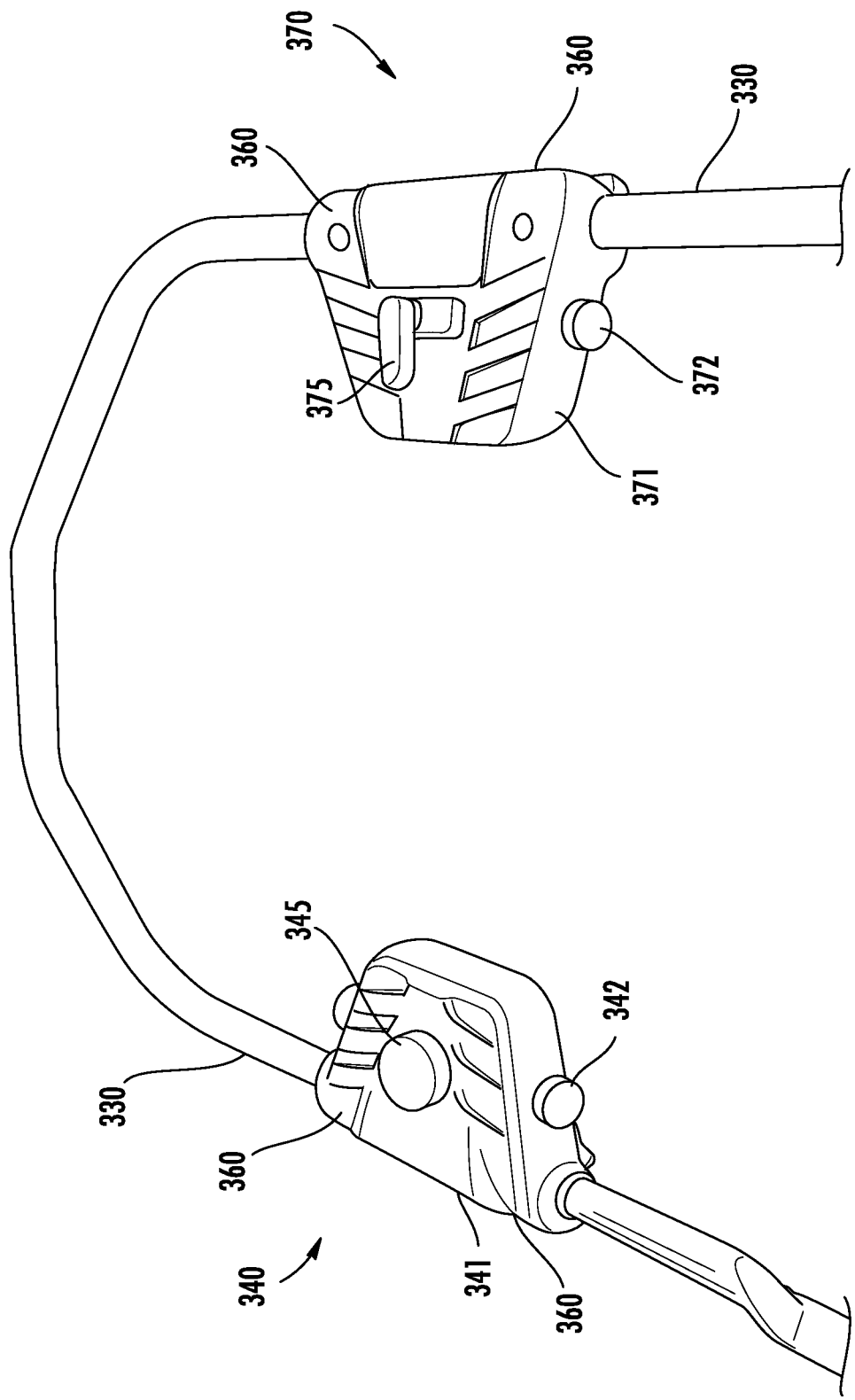
FIG. 15A is a perspective view of a starter switch box and a self-propel switch box of the lawn mower of FIG. 14.
Figure 15B:
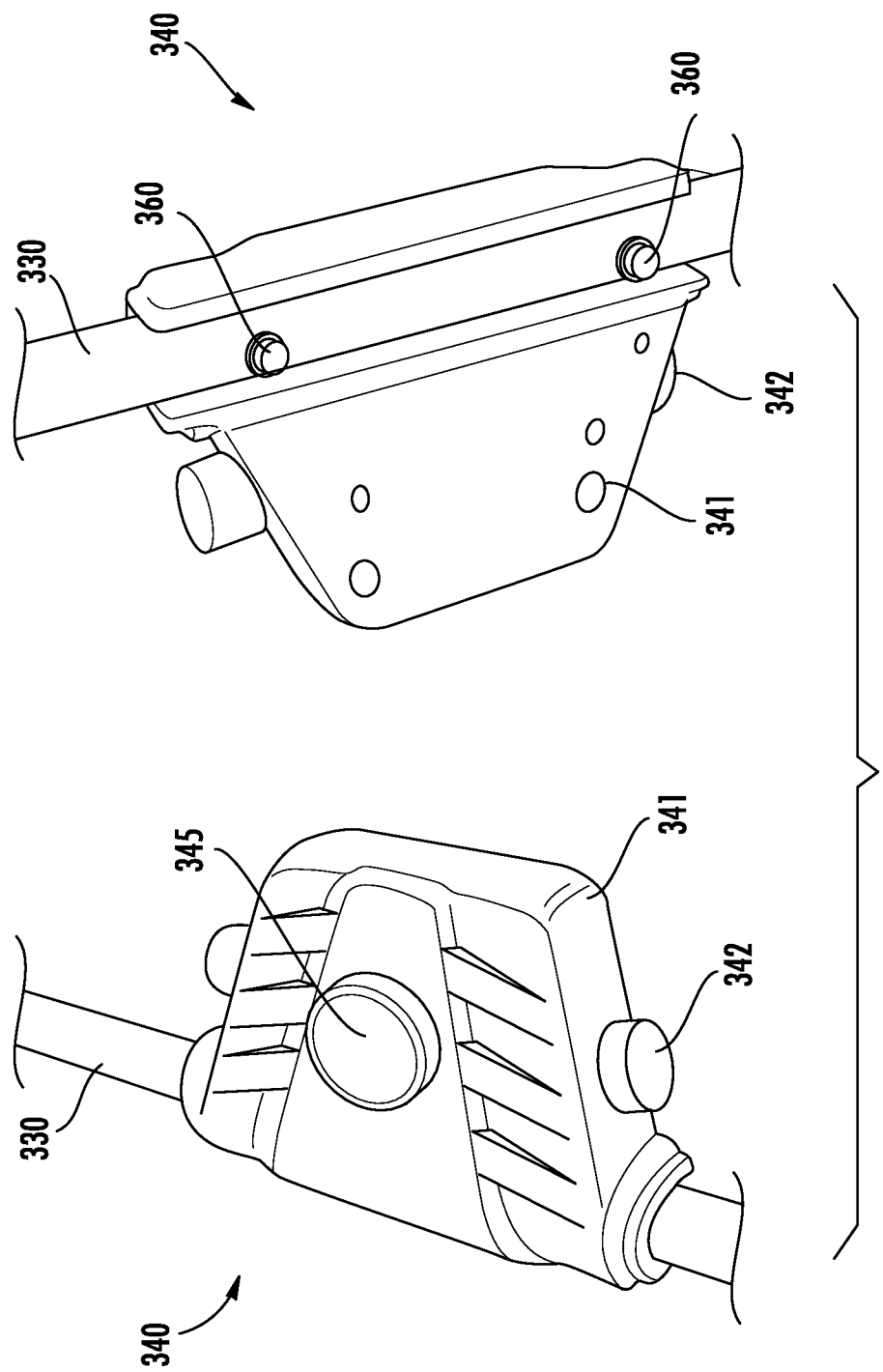
FIG. 15B is a perspective view of the starter switch box of FIG. 15A.
Figure 15C:
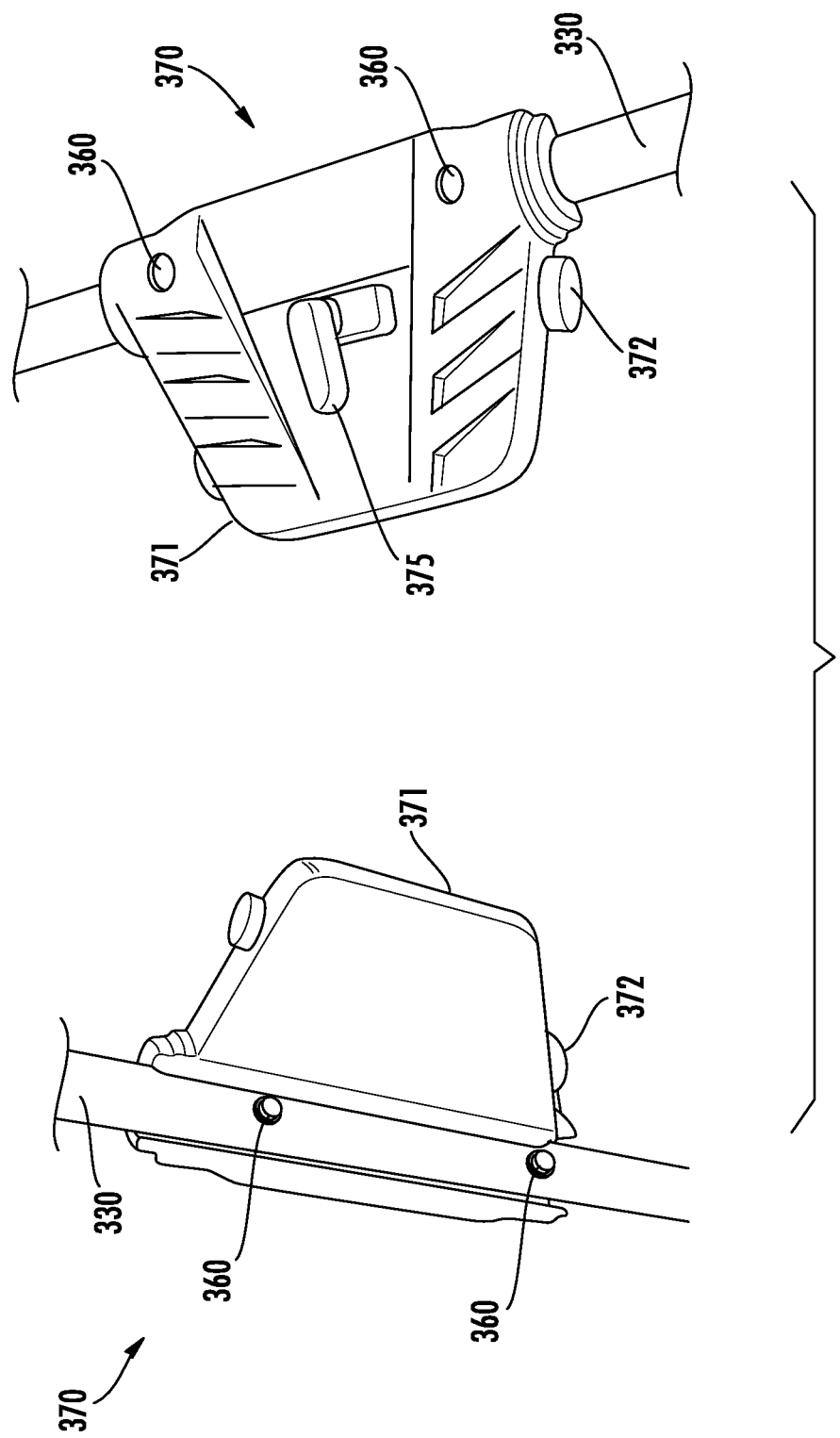
FIG. 15C is a perspective view of the self-propel switch box of FIG. 15A.

Referring to FIGS. 15A-15C, the starter switch box 340 includes a housing 341 with an opening 342. The opening 342 is configured allow coupling of electrical components of the starter switch box 340 to the electrical powerhead 100. The housing 341 is attached to the handle 330 using bolts or other fasteners 360 such that the starter switch box 340 can be attached to the handle 330 without opening the housing 341 and exposing components of the starter switch box 340 to the elements. In some embodiments, a self-propel switch box 370 is included with the lawn mower 300. As shown in FIGS. 15A-15C, the self-propel switch box 370 includes a lever 375 configured to control a self-propel ground speed of the lawn mower. The self-propel switch box 370 includes a housing 371 with an opening 372. The opening 372 is configured to allow coupling of electrical components of the self-propel switch box 370 to the electrical powerhead 100. The housing 371 is attached to the handle 330 using bolts or fasteners 360 such that the self-propel switch box 370 can be attached to the handle 330 without opening the housing 371 and exposing components of the self-propel switch box 370 to the elements.

Figure 15D:
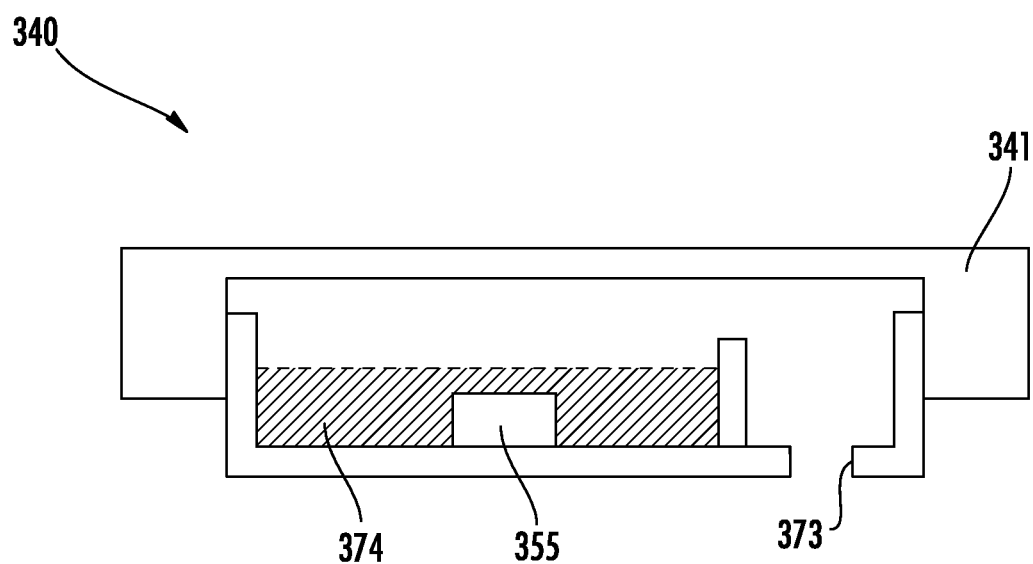
FIG. 15D is a schematic view of the starter switch box of FIG. 15A.

Referring to FIG. 15D, a schematic view of the starter switch box 340 is shown. The starter switch box 340 includes one or more switches 355 (e.g., an electronic assembly) housed within the housing 341. The area (e.g., tray) around the switch 355 is filled with an insulating compound 374 (e.g., potting) that hardens providing protection to the switch 355. The potting may be formed from various compounds, including, but not limited to, epoxy, silicone, urethane, etc. The insulating compound 374 reduces the likelihood of liquid contacting and short-circuiting the switch 355. When liquid (e.g., water) enters the housing 341 of the switch box 340, the liquid does not come into contact with the switch 355. Instead, the liquid flows freely through the housing 341 over the insulating compound 374 without contacting the switch 355 and causing a short. The self-propel switch box 370 (or any other switch box used in conjunction with the electric powerhead 100) similarly includes an insulated compound to protect the switch housed therein from liquid or moisture within the switch box.

Figure 16:
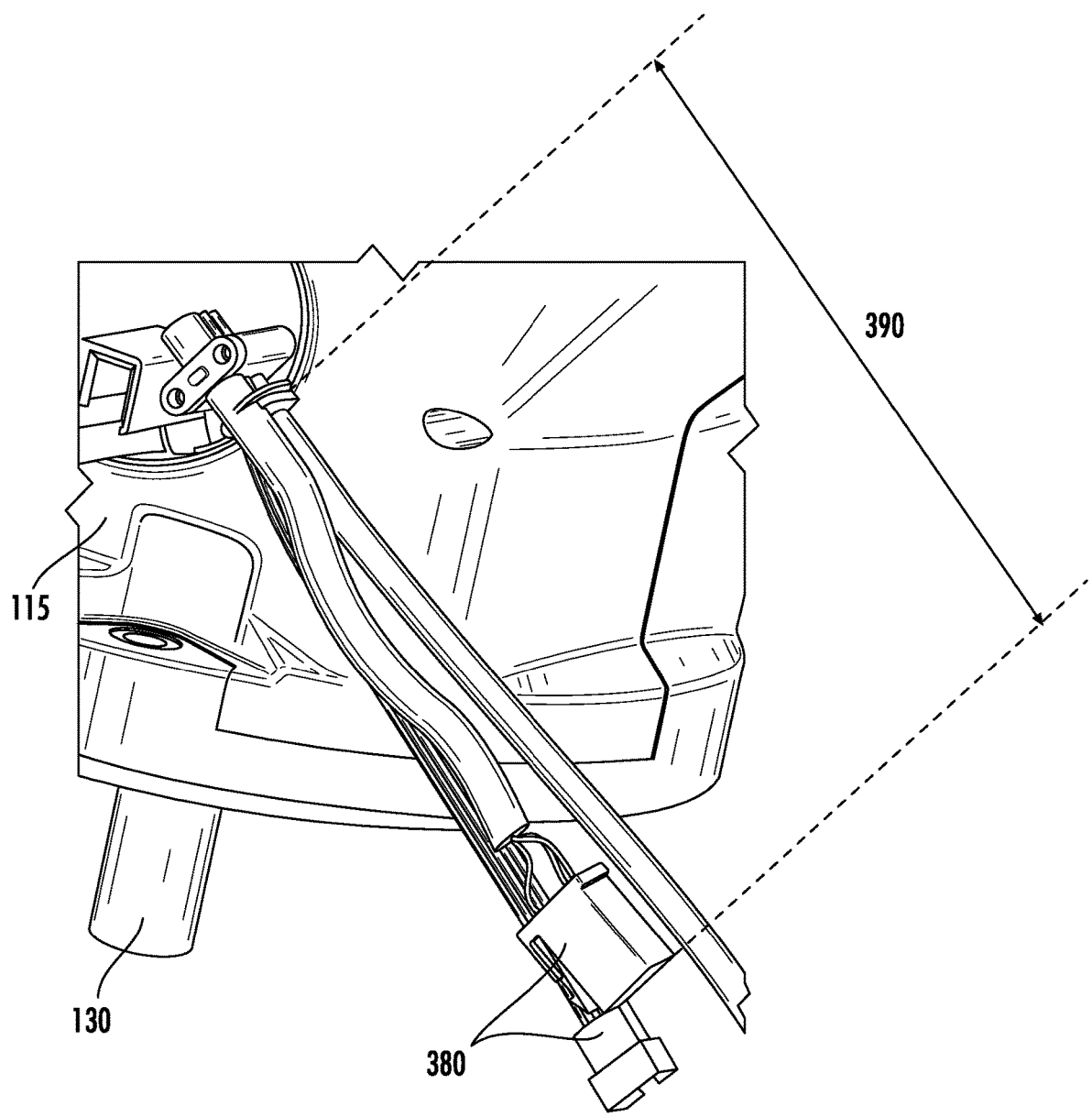
FIG. 16 is a perspective view of an external connector of the electric powerhead of FIG. 1, according to an exemplary embodiment.

As shown in FIG. 16, the electric powerhead 100 includes one or more electrical connectors 380 (e.g., pigtail connector) extending a distance 390 from the housing 115. In other embodiments, the electrical connectors 380 are positioned within the housing 115 of the electrical powerhead 110. In some embodiments, the electrical connectors 380 are located on opposite sides of the powerhead 100, with one electrical connector for the starter switch box 340 on a first side of the powerhead 100 and another electrical connector for the self-propel switch box 370 positioned on a second side of the powerhead 100. The electrical connectors 380 are configured to power the starter switch box 340 and self-propel switch box 370 by electrically coupling to the components of the switch boxes 340, 370 via respective openings 342, 372 of the housings 341, 371. By using an externally accessible connector, the electrical powerhead 100 is easily connected and disconnected from various equipment during assembly.

Figure 17:
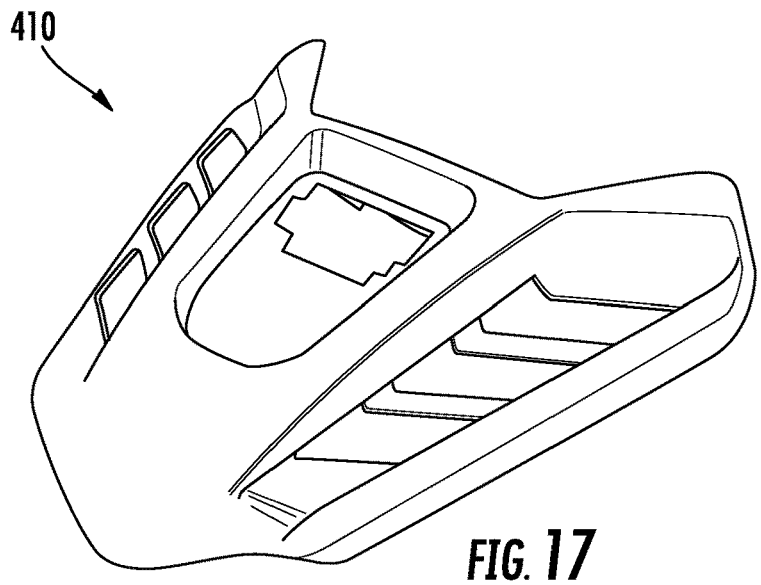
FIG. 17 is a perspective view of a cover insert for use with the electric powerhead of FIG. 1.
Figure 18:
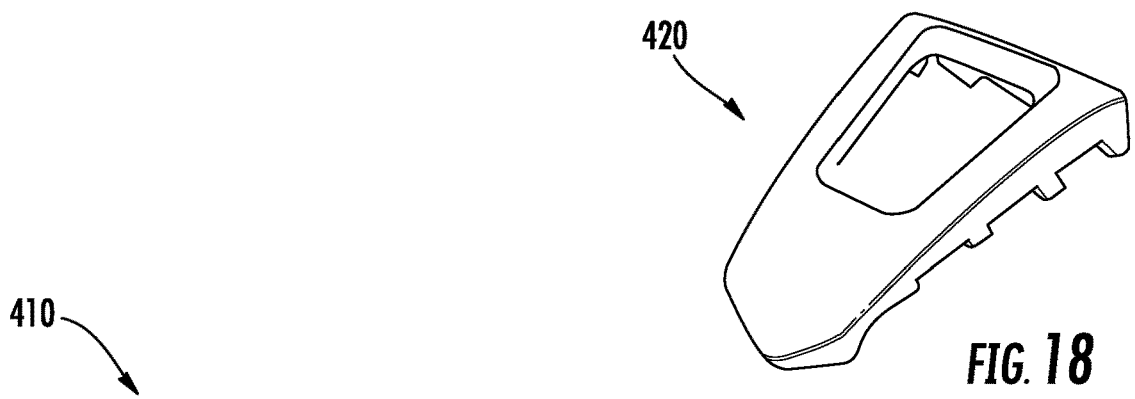
FIG. 18 is a perspective view of a cover insert for use with the electric powerhead of FIG. 1.

Referring to FIGS. 17-18, the electric powerhead 100 can include various cover inserts 410, 420 to removably attach to the top cover 103 positioned on the housing 115. Each cover insert 410, 420 is interchangeable with other cover inserts. Each interchangeable insert can include different stylings that an end customer and/or an OEM can use to customize the overall appearance of the electric powerhead 100 (e.g., by changing the color of the insert, providing inserts displaying different brands, providing inserts providing different styling features, etc.).

Figure 19:
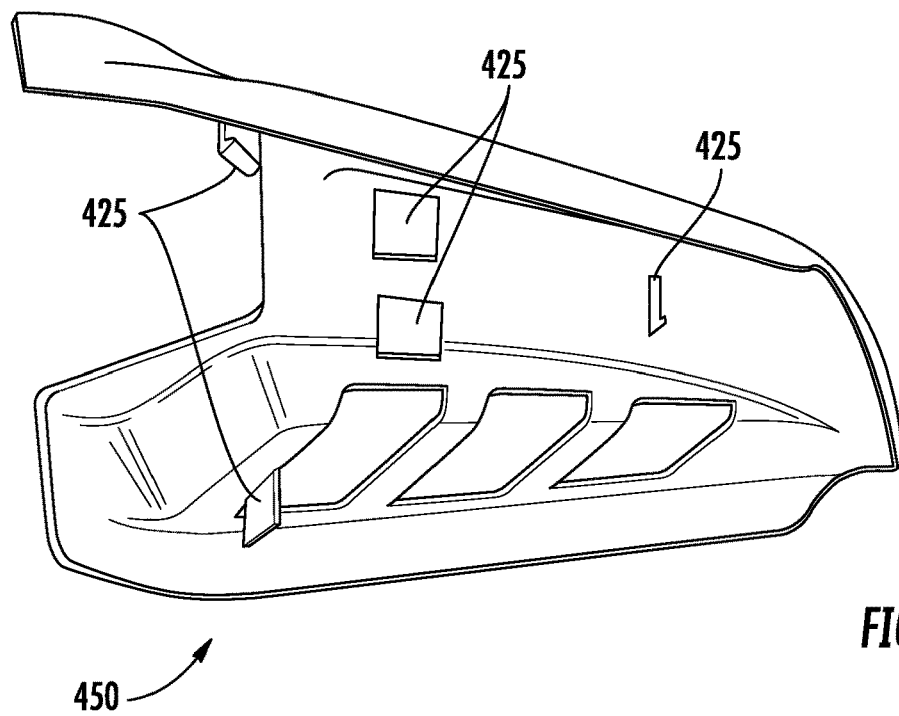
FIG. 19 is a bottom perspective view of a cover insert for use with the electric powerhead of FIG. 1.
Figure 20:
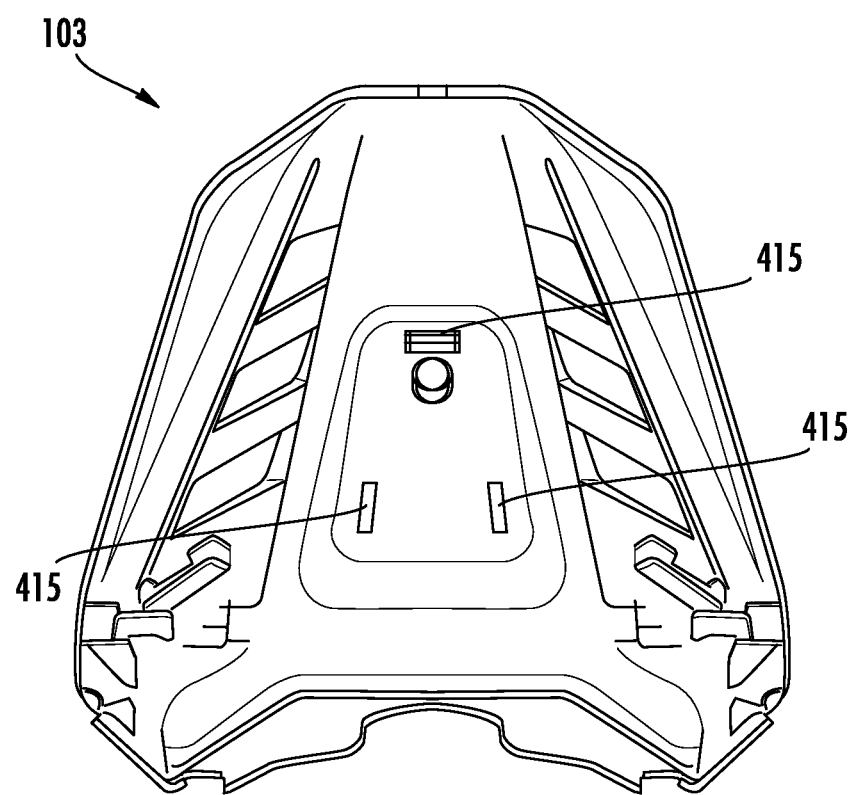
FIG. 20 is a bottom view of the top cover of the electric powerhead of FIG. 1.

Each cover insert 410, 420 includes snap features such that the insert 410, 420 can be attached and detached from the top cover 103 of the electric powerhead 100 without the use of tools. Referring to FIGS. 19-20, the cover insert 410 includes multiple snap features 425 located on the underside 450 of the insert 410 and the top cover 103 includes multiple apertures 415 configured to align with and receive the snap features of the insert 410. Cover insert 420 also includes snap features 425 that are configured to similarly align with the apertures 415 on the top cover 403.

The Appendix included with the U.S. Provisional Application No. 62/469,470, filed on Mar. 9, 2017 and incorporated herein by reference in its entirety, describes and illustrates various aspects of electric powerheads and related outdoor power equipment.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An electric powerhead, comprising:
a housing including a mounting assembly, wherein the mounting assembly comprises:
a plastic mounting plate comprising a shaft opening and a plurality of first openings arranged in a standard vertical shaft engine mounting pattern; and
a metallic mounting insert comprising a plurality of second openings aligned with the plurality of first openings and a plurality of protrusions, wherein the plurality of second openings are formed in the plurality of protrusions; and
an electric motor positioned within the housing, wherein the electric motor includes an output shaft that extends through the shaft opening of the mounting assembly and wherein the output shaft is configured to rotate about an axis of rotation.

2. The electric powerhead of claim 1, wherein the plastic mounting plate is molded over the metallic mounting insert.

3. The electric powerhead of claim 1, wherein the plurality of first openings comprises three openings.

4. The electric powerhead of claim 1, wherein the plurality of second openings comprises three openings.

5. The electric powerhead of claim 1, further comprising a plurality of fasteners extending through the plurality of second openings and engaging an end of each of the plurality of protrusions to attach the electric powerhead to a piece of equipment.

6. The electric powerhead of claim 1, further comprising an external connector spaced apart from the housing and configured to connect to a switch box on a piece of equipment.

7. The electric powerhead of claim 1, wherein the distance between a first end of each of the plurality of protrusions and a second end of the output shaft is between 3 inches and 3.2 inches.

8. The electric powerhead of claim 1, wherein the distance between a first end of each of the plurality of protrusions and a second end of the output shaft is between 2.3 inches and 2.5 inches.

9. The electric powerhead of claim 1, wherein the output shaft has a diameter ranging between 0.8 inches and 1.0 inch.

10. Outdoor power equipment, comprising:
an electric powerhead comprising:
a housing including a mounting assembly, wherein the mounting assembly comprises:
a plastic mounting plate comprising a shaft opening and a plurality of first openings arranged in a standard vertical shaft engine mounting pattern; and
a metallic mounting insert comprising a plurality of second openings aligned with the plurality of first openings; and
an electric motor positioned within the housing, wherein the electric motor includes an output shaft that extends through the shaft opening of the mounting assembly and wherein the output shaft is configured to rotate about an axis of rotation;
a plurality of cover inserts configured to removably attach to the housing, wherein the plurality of cover inserts comprise one or more snap features to removably attach the cover inserts to the housing; and
an electric switch box configured to provide transmission control to the outdoor power equipment.

11. The outdoor power equipment of claim 10, wherein the electric powerhead further comprises an external connector spaced apart from the housing;
wherein the external connector electrically couples to the electric switch box and is configured to provide power to the electric switch box.

12. The outdoor power equipment of claim 10, wherein the electric switch box is configured to attach to a handle of the outdoor power equipment without opening the electric switch box.

13. The outdoor power equipment of claim 10, wherein the electric switch box is configured to provide a self-propel feature to the outdoor power equipment.

14. The outdoor power equipment of claim 10, wherein the mounting plate is molded over and surrounds the mounting insert.

15. The outdoor power equipment of claim 10, wherein the plurality of first openings comprises three openings.

16. The outdoor power equipment of claim 10, wherein the plurality of second openings comprises three openings.

17. The outdoor power equipment of claim 10, wherein the metallic mounting insert further comprises a plurality of protrusions, wherein the plurality of second openings are formed in the plurality of protrusions.

18. The outdoor power equipment of claim 17, further comprising a plurality of fasteners extending through the plurality of second openings and engaging an end of each of the plurality of protrusions to attach the electric powerhead to a piece of equipment.

* * * * *